(12) United States Patent
Brandon

(10) Patent No.: US 7,992,883 B2
(45) Date of Patent: Aug. 9, 2011

(54) FOLDING TABLE CART

(76) Inventor: Thomas K. Brandon, Huntsville, AL (US)

( * ) Notice: Subject to any disclaimer, the term of this patent is extended or adjusted under 35 U.S.C. 154(b) by 45 days.

(21) Appl. No.: 12/215,099

(22) Filed: Jun. 23, 2008

(65) Prior Publication Data

US 2009/0315289 A1     Dec. 24, 2009

(51) Int. Cl.
*B62B 3/10*     (2006.01)
(52) U.S. Cl. .................... 280/79.7; 280/47.34
(58) Field of Classification Search ............... 280/79.7, 280/79.11, 47.34, 47.35
See application file for complete search history.

(56) References Cited

U.S. PATENT DOCUMENTS

| | | | | |
|---|---|---|---|---|
| 1,286,801 A * | 12/1918 | Schumacher | ............... | 414/754 |
| 1,359,032 A * | 11/1920 | Cole | ............... | 211/51 |
| 2,466,149 A * | 4/1949 | Burg | ............... | 280/79.7 |
| 2,621,815 A * | 12/1952 | Gannon | ............... | 414/537 |
| 2,687,310 A * | 8/1954 | Goetz | ............... | 280/46 |
| 2,945,699 A * | 7/1960 | Berlye | ............... | 280/79.3 |
| 3,031,084 A * | 4/1962 | Mugler | ............... | 108/16 |
| 3,445,150 A * | 5/1969 | Zartarian | ............... | 312/249.8 |
| 3,669,464 A * | 6/1972 | Linzmeier | ............... | 280/47.34 |
| 3,889,814 A * | 6/1975 | Rice | ............... | 211/27 |
| D248,937 S * | 8/1978 | Figueroa | ............... | D34/18 |
| 4,360,211 A * | 11/1982 | Blake | ............... | 280/79.7 |
| 4,439,085 A * | 3/1984 | Rodriguez et al. | ............... | 414/447 |
| 4,488,733 A | 12/1984 | Hellsten | | |
| D288,739 S * | 3/1987 | Johnson et al. | ............... | D34/17 |
| 4,679,805 A * | 7/1987 | Cunningham | ............... | 280/33.991 |
| 4,793,624 A * | 12/1988 | Mace | ............... | 280/47.16 |
| 5,037,117 A * | 8/1991 | Hershberger | ............... | 280/79.7 |
| 5,163,695 A * | 11/1992 | Pakowsky | ............... | 280/79.7 |
| 5,226,656 A * | 7/1993 | Mayer | ............... | 280/79.2 |
| 5,584,399 A * | 12/1996 | King | ............... | 211/41.15 |
| 5,871,219 A * | 2/1999 | Elliott | ............... | 280/79.3 |
| 5,899,469 A | 5/1999 | Pinto et al. | | |
| 6,296,262 B1 * | 10/2001 | Skinner | ............... | 280/79.7 |
| 6,450,514 B1 * | 9/2002 | Ronca | ............... | 280/79.11 |
| 6,454,282 B2 * | 9/2002 | Sexton et al. | ............... | 280/79.7 |
| 6,637,761 B1 * | 10/2003 | Boettcher | ............... | 280/47.24 |
| 6,796,564 B2 * | 9/2004 | Kelly | ............... | 280/47.24 |
| 7,004,483 B1 * | 2/2006 | McEntee | ............... | 280/47.35 |
| 2003/0164602 A1 * | 9/2003 | Kuhlman | ............... | 280/79.7 |

* cited by examiner

*Primary Examiner* — Jeffrey J Restifo
(74) *Attorney, Agent, or Firm* — J. Wiley Horton

(57) ABSTRACT

The present invention comprises a cart for collecting, moving and storing folding tables. The cart is generally comprised of a front panel, back panel and two side members. The two side members connect the front panel to the back panel in a rectangular frame shape. The front panel has a receiving edge that is shorter than the height of a conventional table top. Each side member has an outer table bed runner and a backrest runner that meet at a wedge. The outer table bed runner slopes downward from the receiving edge of the front panel to the wedge.

5 Claims, 11 Drawing Sheets

FOLDING TABLE CART

CROSS-REFERENCES TO RELATED APPLICATIONS

Not Applicable

STATEMENT REGARDING FEDERALLY SPONSORED RESEARCH OR DEVELOPMENT

Not Applicable

MICROFICHE APPENDIX

Not Applicable

BACKGROUND OF THE INVENTION

1. Field of the Invention

This invention relates to the field of devices made for receiving folding tables. More specifically, the invention comprises a sloping table bed for receiving, transporting and storing folding tables.

2. Description of the Related Art

Facilities used for meetings, including churches, hotels, convention centers and schools, use institutional folding tables. The tables are usually round or rectangular. They fold for easy storage in small areas and vary in size and weight, ranging from light plastic tables to heavy wooden tables. Events can be held in quick succession requiring the rooms to be cleared and cleaned quickly and efficiently.

Many organizations have small crews of employees or volunteers that help to set up and take down the folding tables. Some organizations may have only one person, perhaps a custodian, or only a few people setting up rooms full of tables. Previously two or more people were needed to set up or take down a table. The tables were picked up by one person at each end by stooping, lifting and turning the table over on its side to fold the legs out or in. Stooping and lifting is required by both people when loading or unloading to or from flatbed carts or vertical stacking carts. Additionally, tables can easily slide off of flatbed or vertical stacking carts potentially damaging the tables or the floor itself, not to mention injuring the people involved. The set up process can be time-consuming, taxing and cumbersome.

Therefore what is needed is a cart which allows simple and efficient assembly and disassembly of folding tables. The present invention achieves this objective, as well as others that are explained in the following description.

BRIEF SUMMARY OF THE INVENTION

The cart is for collecting, moving and storing folding tables. The cart is generally comprised of a front panel, back panel and two side members. The two side members connect the front panel to the back panel in a rectangular frame shape. The front panel has a receiving edge that is shorter than the height of a conventional table top. Each side member has an outer table bed runner and a backrest runner that meet at a wedge. The outer table bed runner slopes downward from the receiving edge of the front panel to the wedge. This downward slope allows a user to easily tip a folding table onto the outer table bed runner, pivoting the table at the wedge. The outer backrest runner is preferably angularly displaced from the outer table bed runner by approximately 90 degrees. Therefore when the user loads a folding table onto the invention the table is tipped against and comes into contact with the outer backrest runner.

The outer table bed runner's descending slope allows the user to easily and quickly load heavy tables by allowing gravity to help move the tables to a loaded position.

Figure 1:
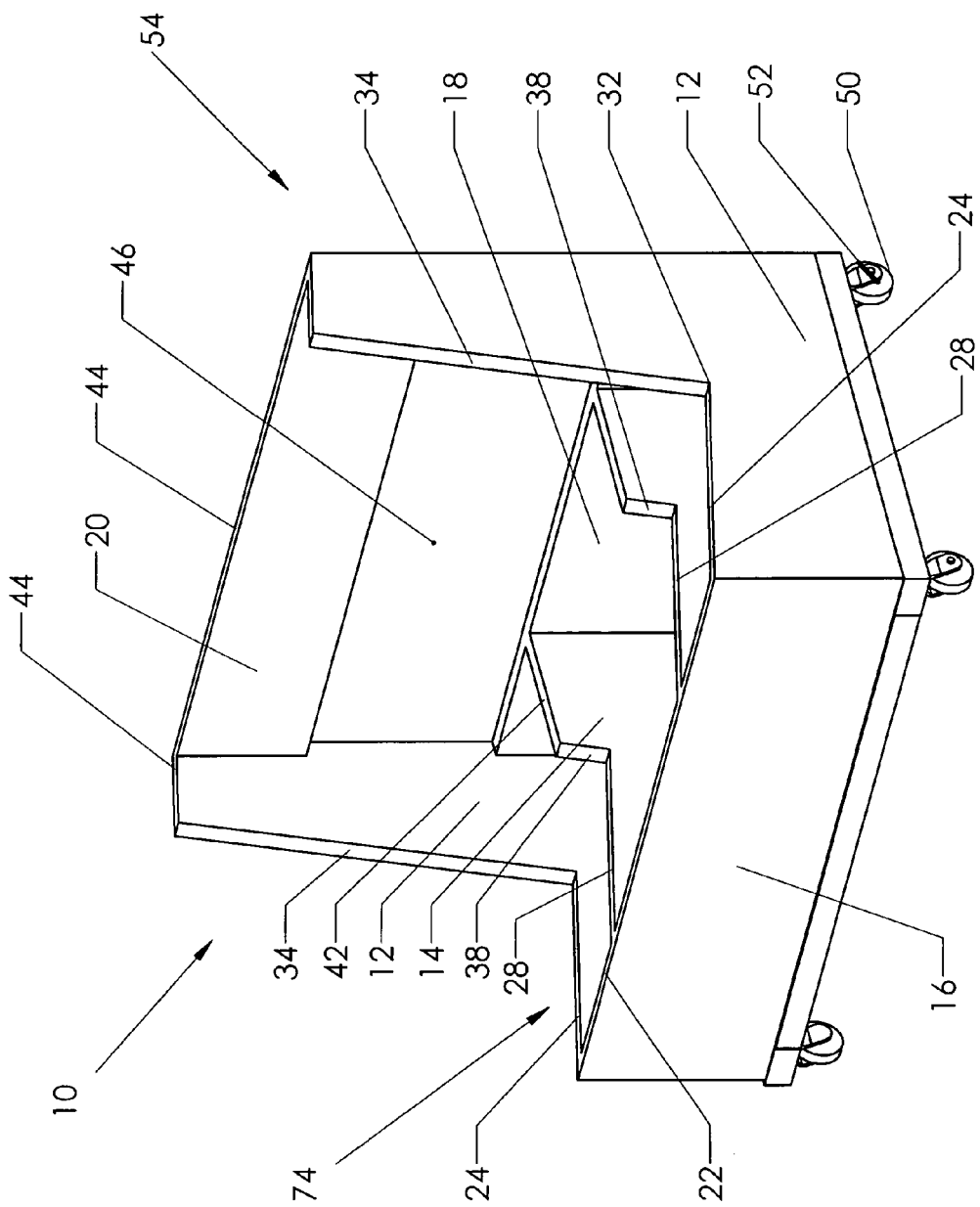
FIG. 1 is a perspective view, showing the present invention.

| REFERENCE NUMERALS IN THE DRAWINGS | | | |
|---|---|---|---|
| 10 | cart | 12 | side member |
| 14 | inner jig | 16 | front panel |
| 18 | lower back panel | 20 | upper back panel |
| 22 | receiving edge | 24 | outer table bed runner |
| 26 | wheel attachment device | 28 | inner table bed runner |
| 30 | support board | 32 | wedge |
| 34 | outer backrest runner | 36 | base frame |
| 38 | inner support | 40 | bottom distance |
| 42 | upper edge of inner jig | 44 | backrest top |
| 46 | back open gap | 48 | bottom open gap |
| 50 | wheel | 52 | brake lever |
| 54 | backrest | 56 | floor surface |
| 58 | table edge | 60 | legs |
| 62 | table top | 64 | back edge |
| 66 | front edge | 68 | circular table |
| 70 | folding table | 72 | table edge |
| 74 | table bed | | |

DESCRIPTION OF THE INVENTION

Figure 2:
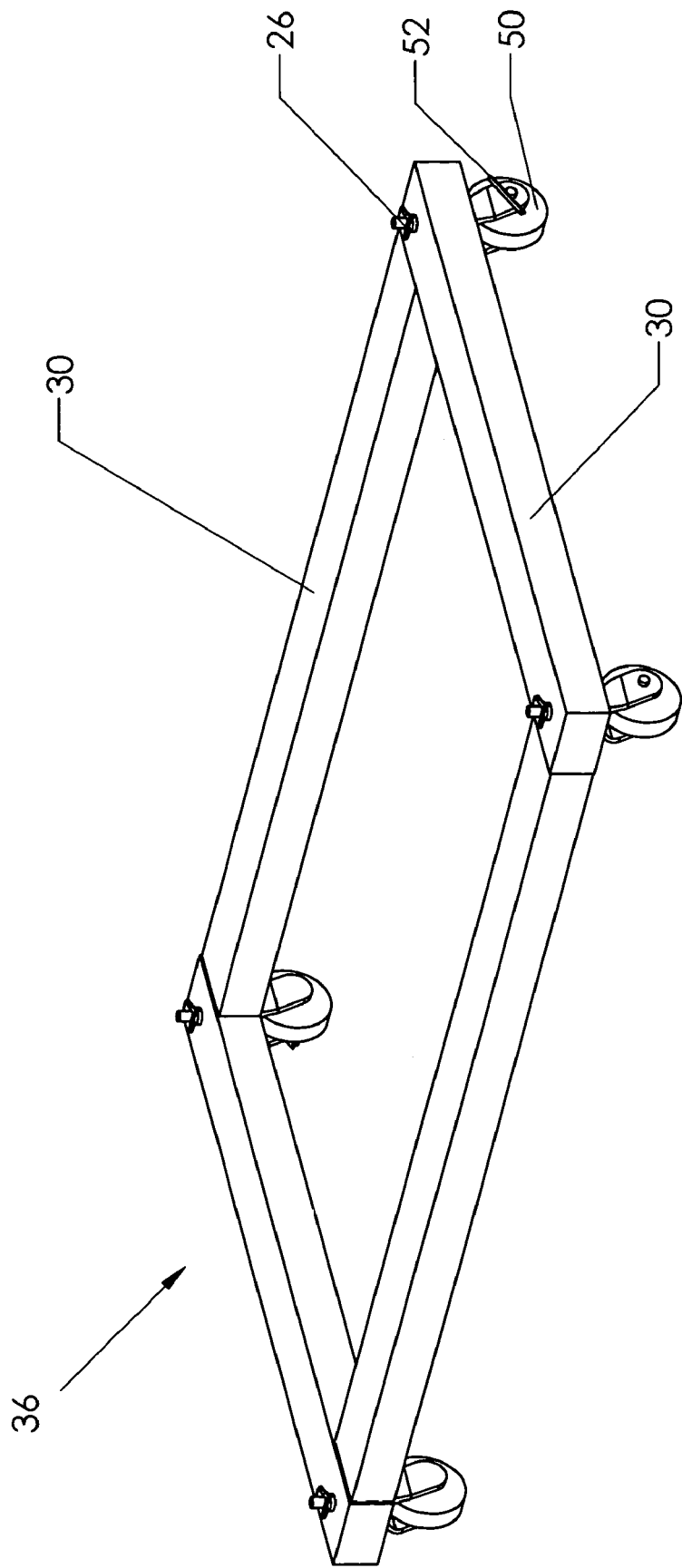
FIG. 2 is a perspective view, showing the base frame of the present invention.

FIG. 1 illustrates the present invention in the preferred embodiment. The cart 10 is supported by base frame 36, shown in FIG. 2. Base frame 36 is made up of four support boards 30, four wheels 50 and four wheel attachment devices 26. The four support boards 30 form a rectangular base frame 36 which uses wheels 50 as a movement method. In the preferred embodiment support boards 30 are wooden 2×4 boards. However, support boards 30 can be made up of many different materials, or even formed as one integral unit. Wheels 50 are attached to support boards 30 by way of wheel attachment devices 26. Wheel attachment devices 26 can be any attachment means which connects wheels 50 to support boards 30. At least two wheels 50 preferably have brake lever 52 attached. This lever can lock a particular wheel when engaged.

Returning to FIG. 1, the present cart 10 is generally made up of front panel 16, two side members 12, lower back panel 18 and upper back panel 20. In the preferred embodiment two inner jigs 14 span the distance between front panel 16 and lower back panel 18. Inner jigs 14 are spaced approximately evenly between side members 12. Receiving edge 22 is located on the upward facing edge of front panel 16. Side members 12 connect front panel 16 to lower back panel 18 creating a box-like structure.

Figure 3:
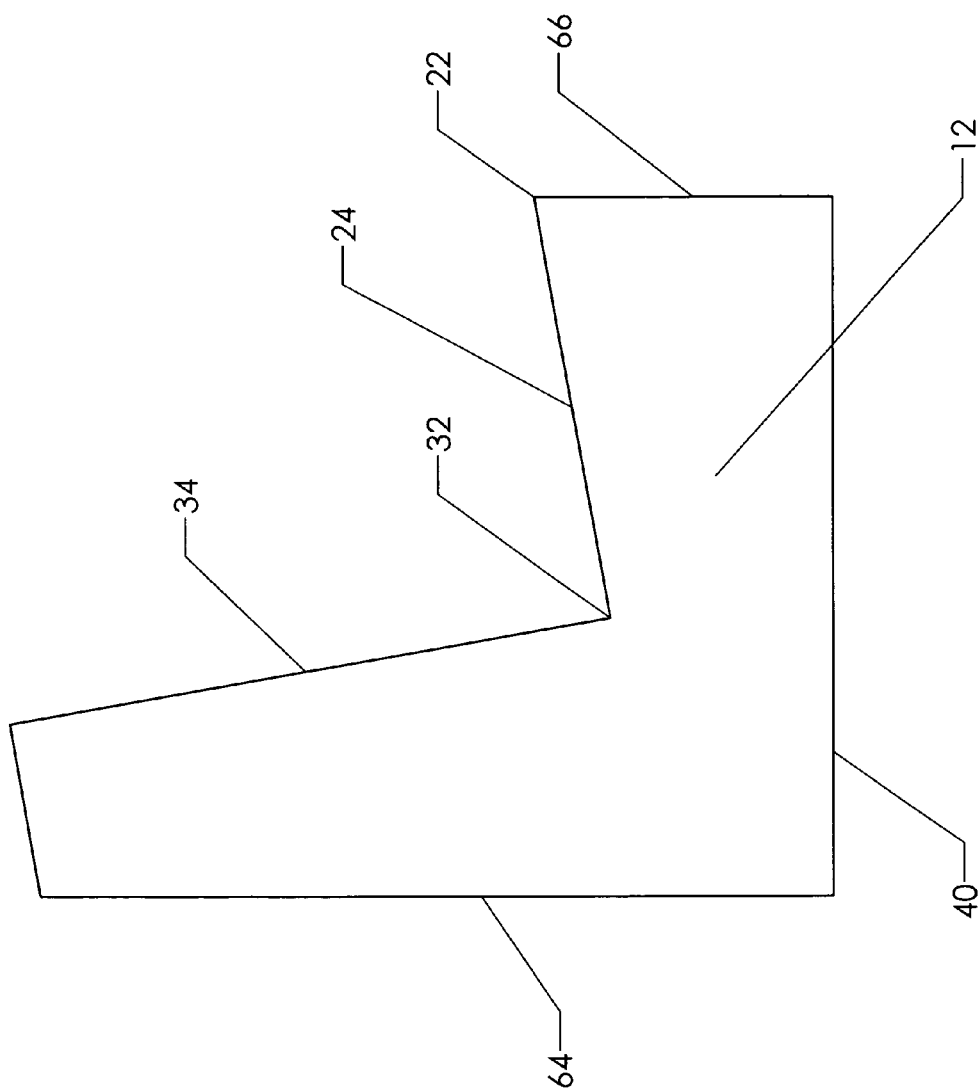
FIG. 3 is an elevation view, showing the geometry of a side member of the present invention.

FIG. 3 is a side elevation view illustrating the preferred geometry of side member 12. The base 40 of side member 12 spans a distance that is greater than the shortest distance between wedge 32 and front edge 66. Outer backrest runner 34 extends angularly upward from wedge 32 away from front edge 66. The angular displacement of outer backrest runner 34 allows a table (not shown) to lean securely against outer backrest runner 34 and be held in place by gravity. Using base 40 as an x-axis the angular displacement of outer backrest runner 34 and outer table bed runner 24 can be better described. Therefore outer backrest runner 34 is preferably angularly displaced from base 40 of side member 12 at approximately a 100 degree angle. Outer table bed runner 24 slopes downward from receiving edge 22 down to wedge 32. Outer table bed runner 24 is preferably angularly displaced from base 40 of side member 12 at approximately a 10 degree angle. Therefore the preferable angular displacement between outer table bed runner 24 and outer backrest runner 34 at wedge 32 is approximately 90 degrees. Thus folding tables can fit securely into wedge 32 because table edges are typically square. The slope of outer table bed runner 24 allows a table to slide back towards wedge 32 and remain tipped back against outer backrest runner 34.

The distance between wedge 32 and back edge 64 is such that a plurality of folding tables (not shown) would not cause the present cart to tip backwards towards back edge 64 under the weight of the tables. The height of back edge 64 is greater than the height of front edge 66.

Again returning to FIG. 1, side members 12 are connected at the back by upper back panel 20 and lower back panel 18. Outer table bed runner 24 is located on the top edge of side member 12 spanning from receiving edge 22 to wedge 32. This surface preferably lies in the same plane as inner table bed runner 28. Wedge 32 is formed by the juncture of outer table bed runner 24 and outer backrest runner 34. Alternatively, outer table bed runner 24 and inner table bed runner 28 could be integrated into one piece thereby creating two thick outer table bed runners 24 on the surface of table bed 74.

Figure 4:
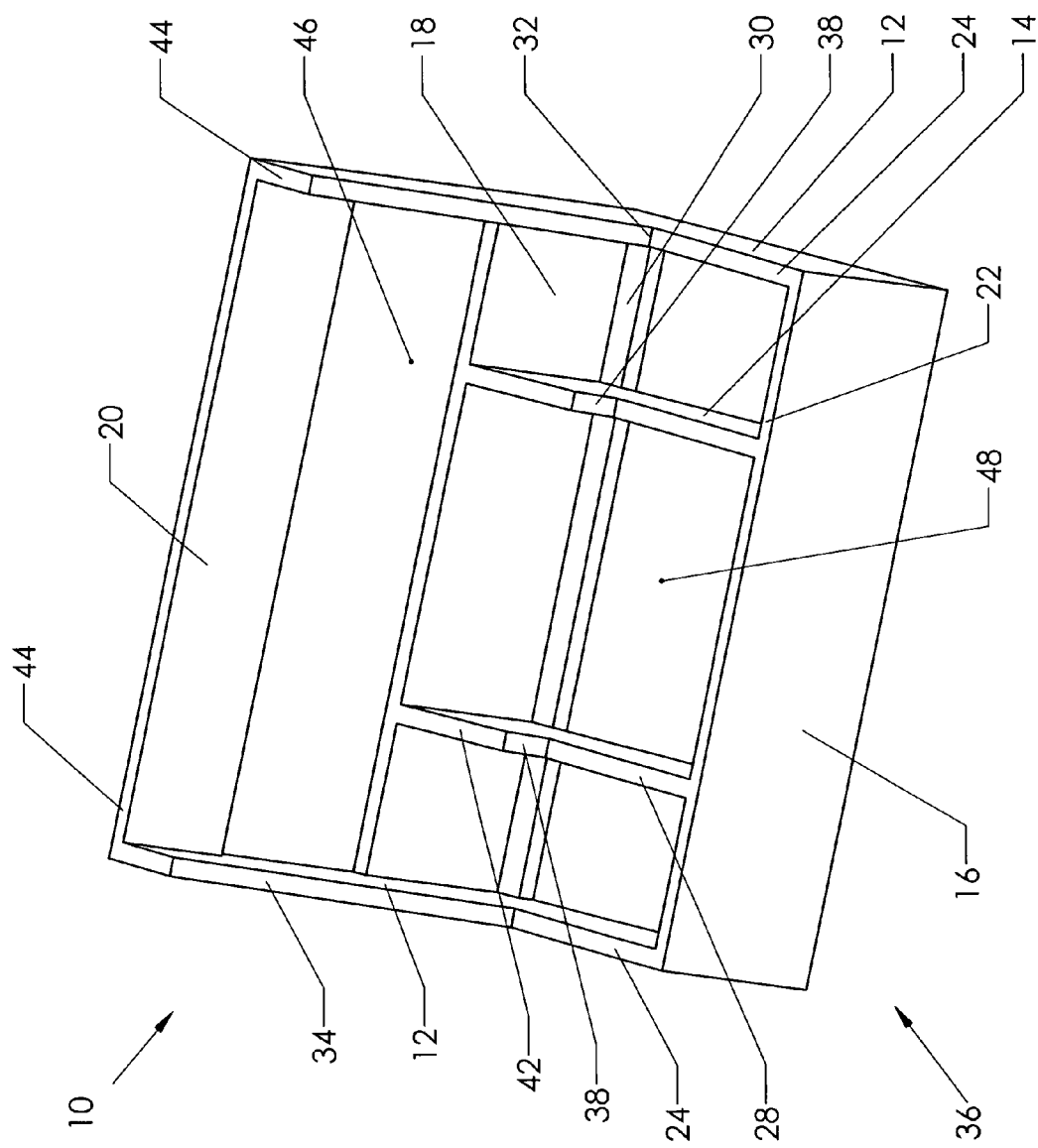
FIG. 4 is a perspective view, showing the preferred embodiment of the present invention from overhead.

FIG. 4 is a perspective overhead view showing the preferred embodiment of the present invention. This view shows bottom open gap 48 between inner jigs 28. Open gap 48 is designed to accept table edge 72 of circular table 68 as shown in FIG. 5 and FIG. 6.

Figure 5:
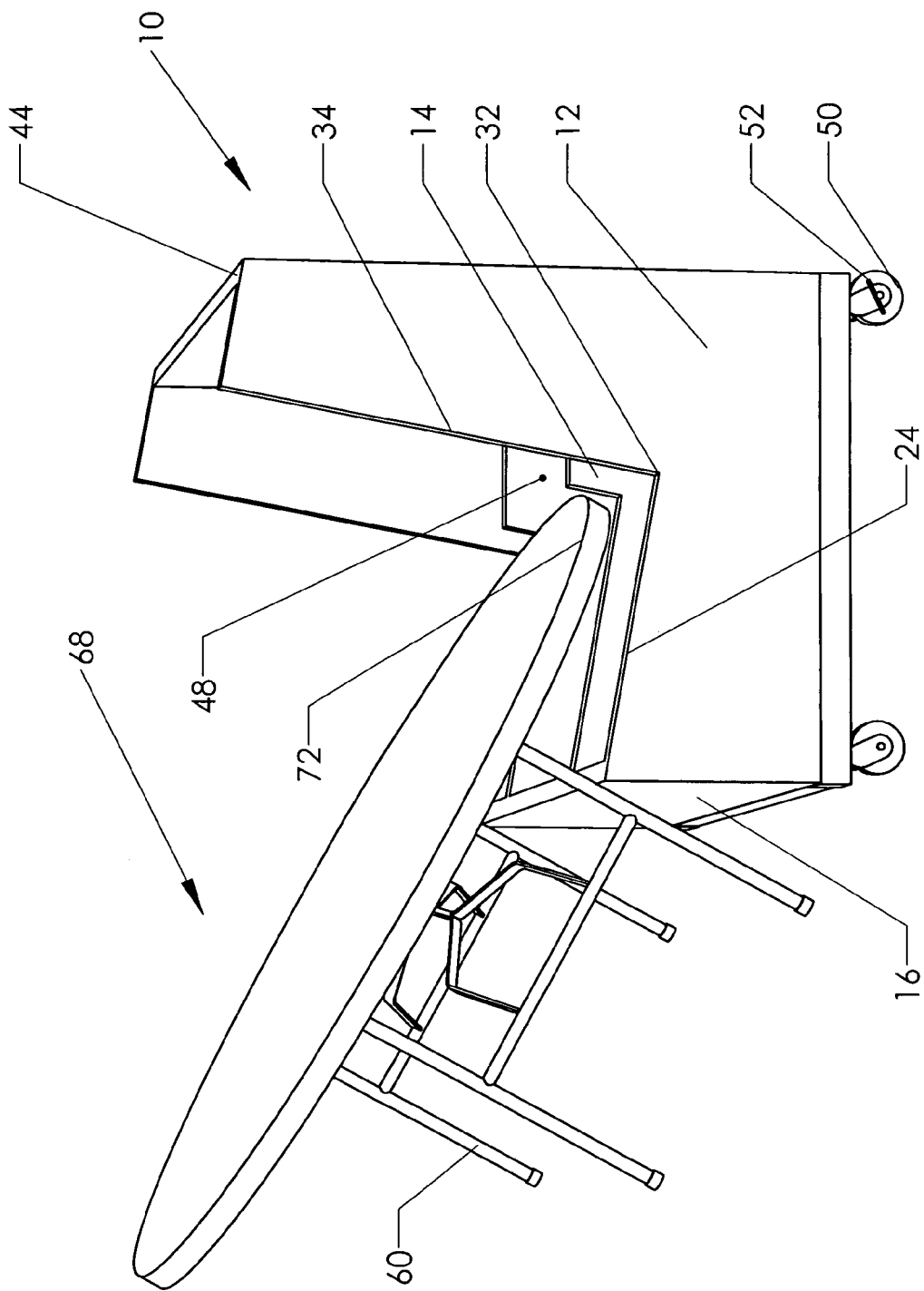
FIG. 5 is a perspective view, showing a circular table being loaded onto the preferred embodiment of the present invention.

FIG. 5 shows a circular table 68 being loaded onto the present cart 10. As circular table 68 is tipped onto cart 10 the table edge 72 protrudes into open gap 48 which is formed between inner jigs 14. The protrusion of table edge 72 into open gap 48 steadies the circular table 68 between inner jigs 14 as circular table 68 is tipped onto cart 10.

Figure 6:
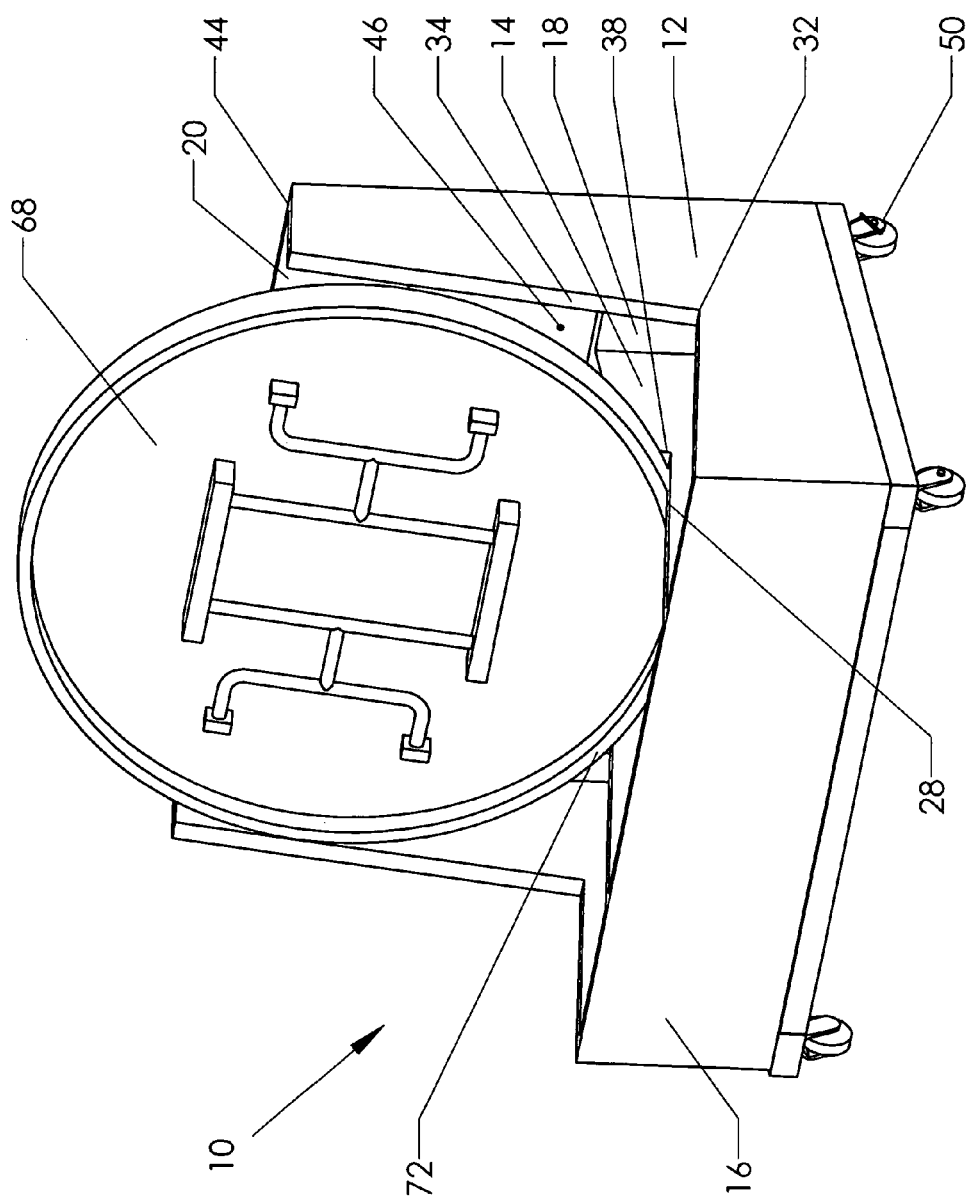
FIG. 6 is a perspective view, showing a circular table loaded onto the preferred embodiment of the present invention.

FIG. 6 illustrates circular table 68 loaded onto present cart 10. Table edge 72 descends down into open gap 48. Open gap 48 and inner jigs 14 therefore prevent circular table 68 from rolling off of cart 10. Circular table 68 rests against inner support 38 and outer backrest runner 34.

Figure 7:
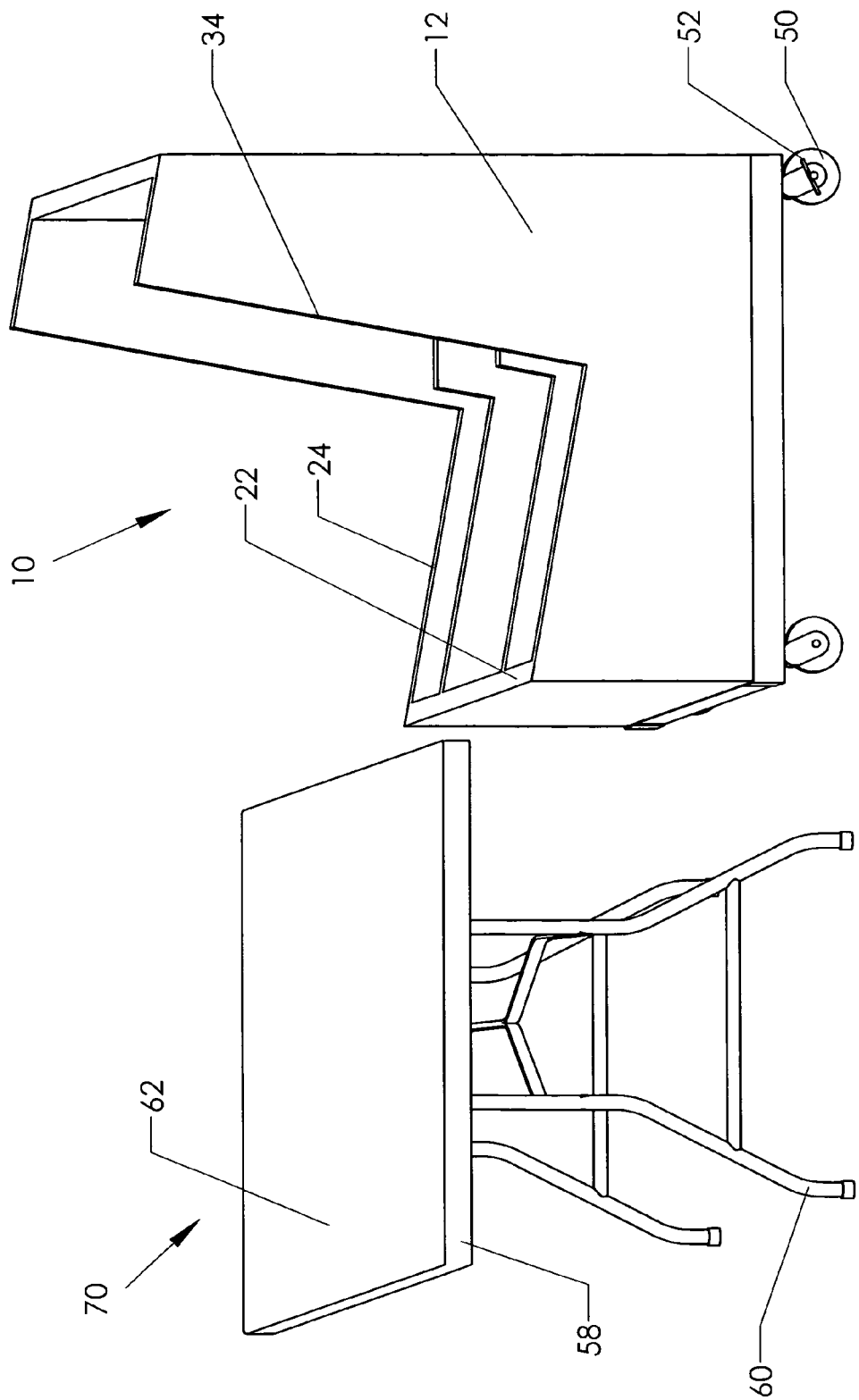
FIG. 7 is a perspective view, showing a folding table in position to be loaded onto the present invention.

The illustration in FIG. 7 portrays the present invention ready to accept a rectangular folding table 70. The height of receiving edge 22 is lower than the bottom of table edge 58. This allows the user to push the folding table 70 slightly over receiving edge 22 before tipping the folding table 70 onto cart 10. Brake lever 52 on wheel 50 should be engaged so that wheels 50 are locked and will not move when folding table 70 is being loaded onto cart 10.

Figure 8:
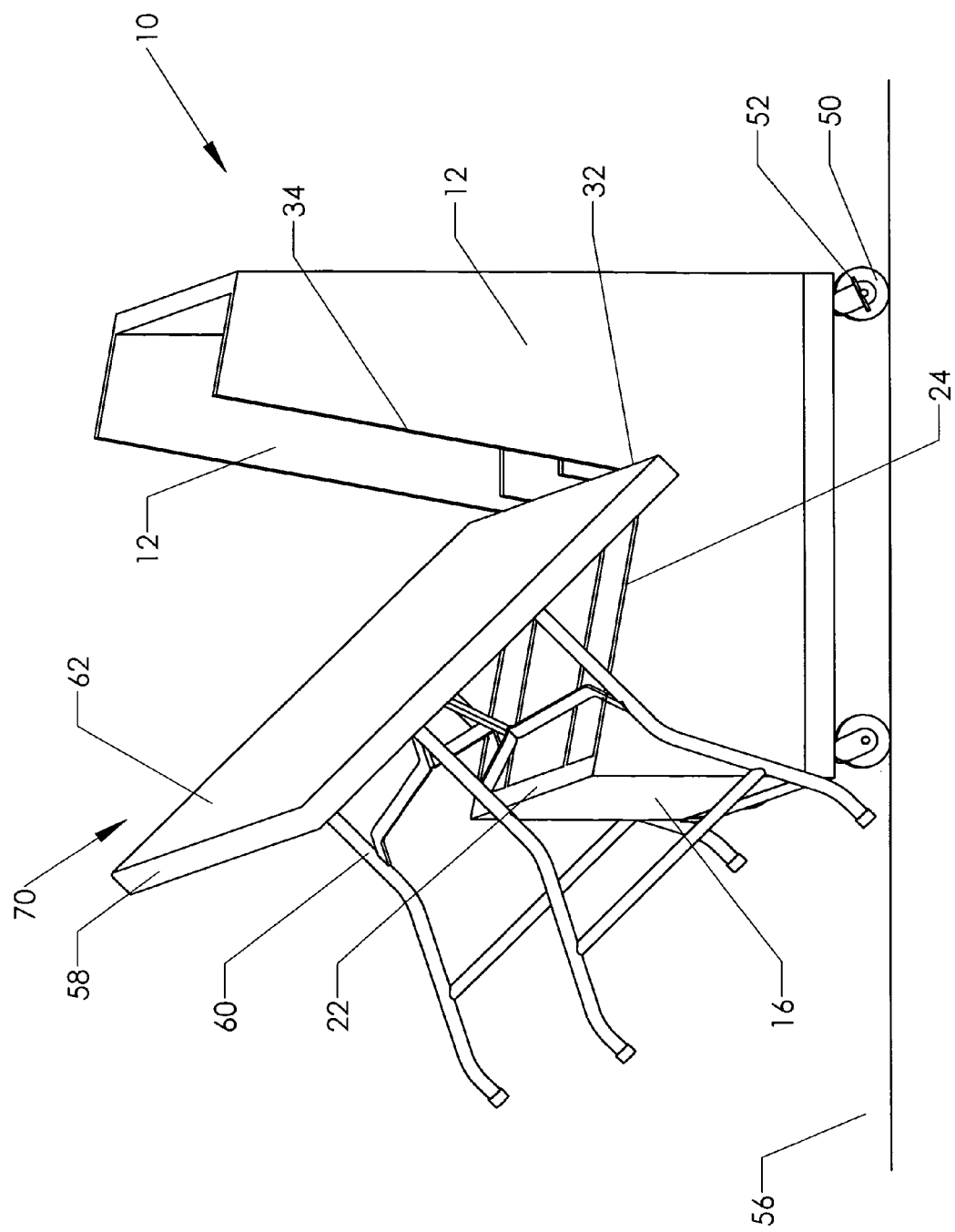
FIG. 8 is a perspective view, showing a folding table being loaded onto the present invention.

As the user tips the folding table 70 onto cart 10, as shown in FIG. 8, table edge 58 slides down outer table bed runner 24. The user pivots the folding table 70 at wedge 32 towards outer backrest runner 34. The downward slope of outer table bed runner 24 from receiving edge 22 to wedge 32 allows the folding table 70 to easily slide back towards outer backrest runner 34 creating a simple way for one person to load a heavy table, utilizing gravity to the user's advantage.

Figure 9:
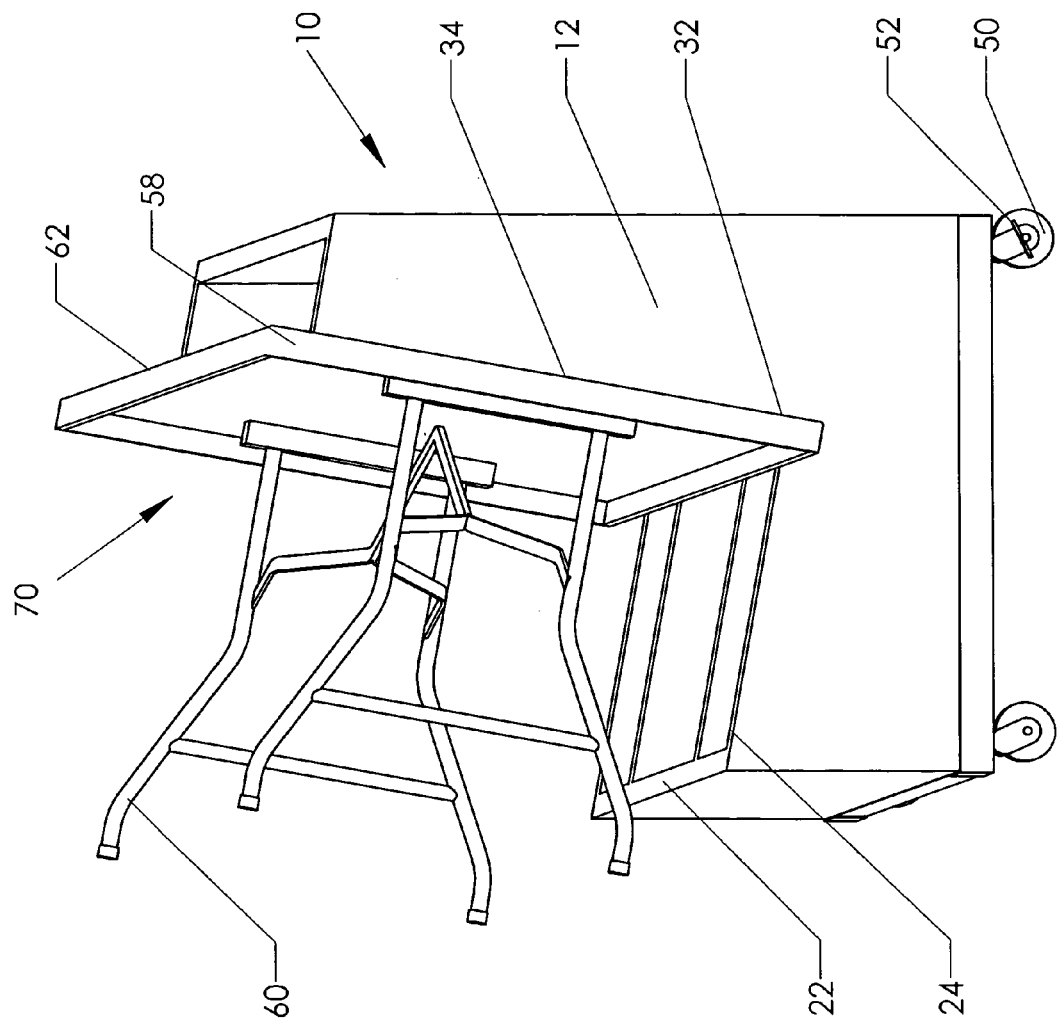
FIG. 9 is a perspective view, showing a folding table being loaded onto the present invention.

FIG. 9 illustrates the folding table 70 loaded completely onto cart 10 prior to folding the legs 60 on folding table 70. Table top 62 comes to rest against outer backrest runner 34 when folding table is completely loaded onto cart 10. Because of the angular displacement of outer backrest runner 34 folding table 70 does not lose contact with outer backrest runner 34 when user lets go of folding table 70 in this position with legs 60 fully extended.

Figure 10:
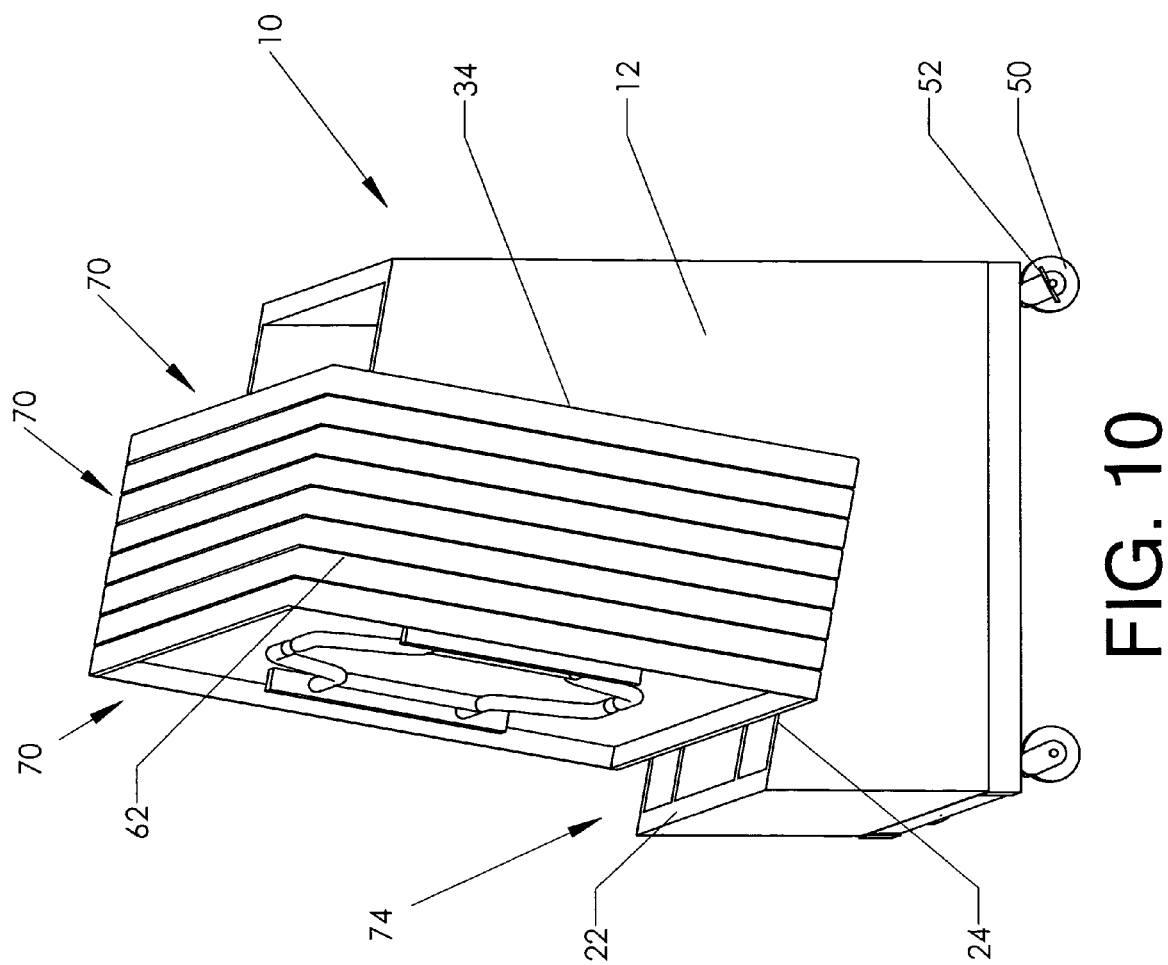
FIG. 10 is a perspective view, showing a plurality of folding tables loaded onto the present invention.

FIG. 10 shows a multitude of folding tables 70 loaded onto cart 10. As each folding table 70 is loaded onto cart 10 the table top 62 of each successive folding table 70 comes into contact with and rests against the bottom of the folding table 70 in front of it. It is in this manner that many folding tables 70 can be loaded onto cart 10 at one time. The generally smooth planar surface of outer table bed runners 24 and inner table bed runners 28 creates a table bed 74 which allows any number of different shapes and sizes of folding tables 70 to be loaded at one time onto the present cart 10.

Figure 11:
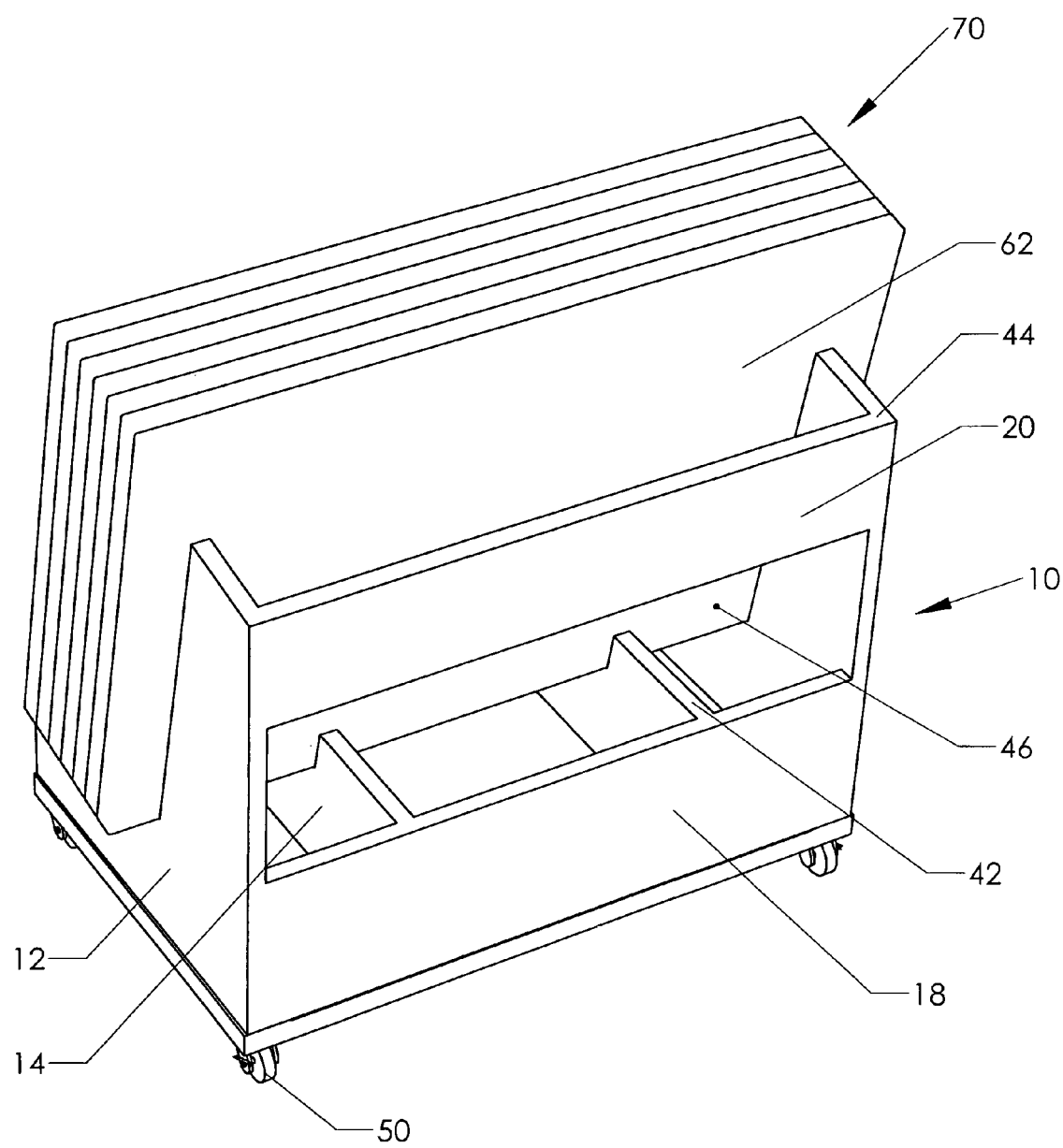
FIG. 11 is a perspective view, showing a back view of the present invention with a plurality of folding tables loaded.

FIG. 11 is a back view of the present invention with a plurality of folding tables 70 loaded onto cart 10. In the preferred embodiment the gap between table top 62 and upper back panel 20 is wide enough so that cart 10 will not tip backwards under the weight of a plurality of folding tables 70. Cart 10 can be easily wheeled by grasping upper back panel 20 either from the top, along backrest top 44, or bottom, through back open gap 46.

The preceding description contains significant detail regarding the novel aspects of the present invention. It should not be construed, however, as limiting the scope of the invention but rather as providing illustrations of the preferred embodiments of the invention. As an example, the upper back panel 20 and lower back panel 18 could be one integrated unit. Additionally, front panel 16 could be substantially lower than the table top 62. Thus, the scope of the invention should be fixed by the following claims, rather than by the examples given.

The invention claimed is:

1. A cart for use on a floor surface on which a user can collect, move and store folding tables, said folding tables having a table top, an edge to said table top, and a plurality of legs, said cart comprising:
   a. a front panel having a first end, a second end and an upper receiving edge, wherein said upper receiving edge is configured to accept said folding tables;
   b. a back panel having a first end and a second end;
   c. a first side member attached to said first end of said front panel and said second end of said back panel;
   d. wherein said first side member includes:
      i. an outer table bed runner having a first end and a second end;

ii. an outer backrest runner having a lower extreme and an upper extreme;
iii. a wedge, located at said second end of said outer table bed runner and said lower extreme of said outer backrest runner;
iv. wherein said first end of said outer table bed runner attaches to said receiving edge of said front panel;
v. wherein said outer table bed runner slopes downward towards said wedge;
vi. wherein said outer table bed runner meets said outer backrest runner at said wedge; and
vii. wherein said outer backrest runner is approximately perpendicular from said outer table bed runner;
e. a second side member attached to said second end of said front panel and said second end of said back panel;
f. wherein said second side member includes:
  i. an outer table bed runner having a first end and a second end;
  ii. an outer backrest runner having a lower extreme and an upper extreme;
  iii. a wedge, located at said second end of said outer table bed runner and said lower extreme of outer backrest runner;
  iv. wherein said first end of said outer table bed runner attaches to said receiving edge of said front panel;
  v. wherein said outer table bed runner slopes downward towards said wedge;
  vi. wherein said outer table bed runner meets said outer backrest runner at said wedge; and
  vii. wherein said outer backrest runner is approximately perpendicular from said outer table bed runner;
g. wherein said outer table bed runners are configured to allow said edge of said table top to slide along said outer table bed runner towards said outer backrest runner; and
h. a plurality of inner jigs, located between said outer table bed runners, having a first end and a second end, wherein said first end of said inner jigs attach to said receiving edge of said front panel and wherein said second end of said inner jigs attach to said back panel.

2. A cart as recited in claim 1, further comprising a bottom open gap between said plurality of inner jigs.

3. A cart as recited in claim 2, wherein said table top of said folding table has a circular edge, wherein said bottom open gap is configured to accept said circular edge.

4. A cart for use on a floor surface on which a user can collect, move and store folding tables, said folding tables having a table top and a plurality of legs, said cart comprising:
a. a front panel having a first end, a second end and an upper receiving edge, wherein said upper receiving edge is configured to accept said folding tables;
b. a back panel having a first end and a second end;
c. a first side member attached to said first end of said front panel and said second end of said back panel, wherein said first side member further comprises an outer backrest runner having a lower extreme and an upper extreme;
d. a second side member attached to said second end of said front panel and said second end of said back panel, wherein said second side member further comprises an outer backrest runner having a lower extreme and an upper extreme;
e. a table bed having a first end and a second end, wherein said first end of said table bed attaches to said upper receiving edge of said front panel; and
f. wherein said table bed includes:
  i. at least one outer table bed runner having a first end and a second end;
  ii. a wedge, located at said second end of said at least one outer table bed runner and said lower extreme of said outer backrest runner;
  iii. wherein said first end of said at least one outer table bed runner attaches to said receiving edge of said front panel;
  iv. wherein said at least one outer table bed runner slopes downward towards said wedge;
  v. wherein said at least one outer table bed runner meets said outer backrest tinnier at said wedge; and
  vii. wherein said at least one outer backrest runner is approximately perpendicular from said at least one outer table bed runner; and
  viii. at least two inner jigs, located between said outer table bed runners, having a first end and a second end, wherein said first ends of said inner jigs attach to said receiving edge of said front panel and wherein said second ends of said inner jigs attach to said back panel.

5. A cart as recited in claim 4, further comprising a bottom open gap between said at least two inner jigs.

\* \* \* \* \*